May 23, 1961  H. L. SHAW ET AL  2,985,468
ROTARY FLUID CONNECTION WITH SIDE DELIVERY
Filed April 21, 1958
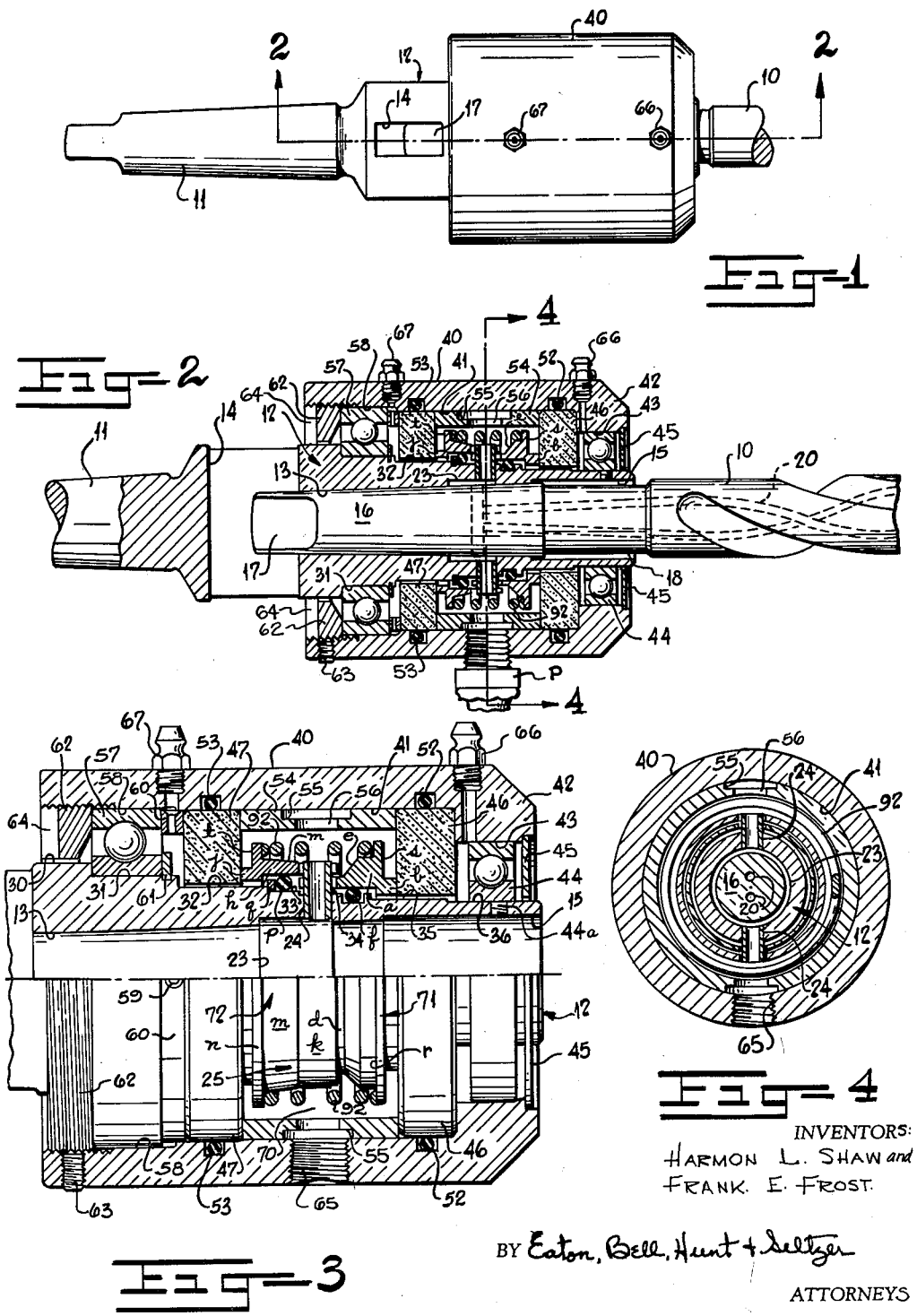
INVENTORS:
HARMON L. SHAW and
FRANK E. FROST.
BY Eaton, Bell, Hunt & Seltzer
ATTORNEYS

United States Patent Office 2,985,468
Patented May 23, 1961

2,985,468
ROTARY FLUID CONNECTION WITH SIDE DELIVERY

Harmon L. Shaw and Frank E. Frost, Charlotte, N.C., assignors to Perfecting Service Company, Charlotte, N.C., a corporation of North Carolina Filed Apr. 21, 1958, Ser. No. 729,737

2 Claims. (Cl. 285—190)

This invention relates to a rotary fluid connection or joint in which a mechanical seal is provided between relatively rotatable interconnected members to permit the introduction of fluid into one member from where it may be conducted through a passageway in the other member without leakage. More particularly, this invention concerns a rotary fluid connection having means for introducing a coolant or lubricant into the side of a rotary component, such as a shaft or the like, and constitutes an improvement over the rotary fluid connection disclosed and claimed in our prior United States Letters Patent No. 2,772,897, issued December 4, 1956. In passing a coolant or lubricant, such as water, oil or the like, through a rotary shaft, it is desirable to introduce the coolant radially of the rotary shaft rather than axially because of space limitations frequently encountered.

The present invention may be used with various types of shafts or rotary components having fluid conducting passageways therein, being especially adapted to be used in association with a chuck adaptor for a machine tool having a long boring instrument or drill provided with one or more passageways therein for feeding a coolant or lubricant to the cutting end of the instrument. When coolant or lubricant is forced under pressure through the passageway in a drill while it is being operated, the coolant or lubricant not only cools the drill and the object against which it is directed, but also aids in washing the chips out of the hole made in the object by the drill.

A rotary fluid connection of this type is a self-contained, generally exposed unit and must support its own weight as well as the weight of conduits connected thereto, thereby giving rise to many problems which must be surmounted for the rotary fluid connection to perform satisfactorily. Among these problems are the extensive amounts of exterior stresses and strains undergone by the rotary fluid connection when it is placed in use, which makes it mandatory that the rotary fluid connection be sufficiently durable and strong to stand blows and knocks. When used with a rotary drill, for example, the rotary fluid connection must be capable of withstanding a considerable amount of vibration which may be imparted thereto by the drill.

A drill, as well as the rotary fluid connection used with it, is essentially a replaceable component, thus leading to the desirability of providing a rotary fluid connection from which the drill may be quickly detached or installed and which can be quickly assembled and disassembled itself from the machine to which it is attached. Since the rotary fluid connection is a self-contained unit, there is a distinct probability that misalinement between the rotary member of the connection and the rotary machine component with which it is used will create misalinement between the rotary and stationary members of the connection, resulting in increased demands on the seal therewithin. If the seal should leak or fail, the rotary fluid connection will no longer be effective to pass coolant or lubricant under the desired pressure to the rotary shaft or drill.

Various conditions of pressure and temperature as well as changing speeds of rotation must be successfully accommodated by a rotary fluid connection. When used with modern-day equipment, the rotary member in the connection must be able to rotate at high speeds without an excessive build-up of friction. Where the fluid pressure and temperature involved are relatively high and variable and high speed rotation is also required, extreme conditions exist which are likely to cause excessive wear and increased friction between relatively movable parts, such as bearings and seal components, with resulting failure of the rotary fluid connection. Seals for rotary fluid connections which are made up of a multiplicity of components are thus at a decided disadvantage under conditions such as those existing in modern equipment.

It is a principal object of this invention to provide a rotary fluid connection for introducing fluid radially of a rotary component, such as a drill, wherein the connection has a pressure chamber into which fluid is admitted for passage to the rotary component, said chamber being sealed at each end by a double-acting mechanical seal comprising a first pair of spaced sealing surfaces and a second pair of sealing surfaces relatively rotatable with respect to the first pair and biased in opposite directions into engagement with the corresponding sealing surface of the first pair, the second pair of sealing surfaces being formed on respective sealing rings having configurations so arranged as to substantially cancel out the effect of the fluid pressure in the chamber tending to increase the sealing pressure between the relatively rotatable sealing surfaces.

It is another object of this invention to provide in a rotary fluid connection of the type described, a double-acting mechanical seal comprising a pair of spaced seal seats carried by one member of the connection and a pair of sealing rings relatively rotatable with respect to the seal seats, said sealing rings being biased axially apart into sealing engagement with the proximal surfaces of the seal seats and being mounted for floating movement on the other member of the connection to compensate for any misalinement created between the members of the connection for maintaining an effective seal with a minimum number of parts subjected to wear.

It is another object of this invention to provide in a double-acting mechanical seal for a rotary fluid connection of the type described, wherein the mechanical seal comprises a pair of spaced seal seats, a pair of sealing rings relatively rotatable with respect thereto, and means for biasing the sealing rings axially apart into sealing engagement with the proximal surfaces of the seal seats, an improved means for preventing relative rotation while permitting axial movement between the pair of sealing rings and the member of the connection associated therewith, said improved means including at least one pin projecting radially from the member of the connection into axially elongated slots formed in proximal overlapping portions of the pair of sealing rings, the pin being tubular and providing communication between a passageway in the member from which it projects and a fluid-conducting port directed through the other member of the connection.

Some of the objects of the invention having been stated, other objects will appear as the description proceeds when taken in connection with the accompanying drawings, in which—

Figure 1 is an elevation of the improved rotary fluid connection showing a portion of a rotary component with which it is used, such as a drill, extending from the right-hand side thereof;

Figure 2 is an enlarged longitudinal sectional view taken along line 2—2 in Figure 1;

Figure 3 is a greatly enlarged fragmentary longitudinal sectional view of the rotary fluid connection, with portions thereof being shown in elevation and omitting the drill;

Figure 4 is a transverse sectional view taken along line 4—4 in Figure 2.

Referring more specifically to the drawings, the rotary fluid connection embodying the present invention is particularly devised for directing fluid under pressure between a pair of detachably interconnected rotary elements 10 and 11 which collectively constitute a rotary member 12. The element 10 is shown in the form of a male rotary component, such as a drill shaft and the element 11 is in the form of a female rotary element or chuck adaptor 11. The rotary element 11 is adapted to be connected to a spindle or chuck of a machine tool, such as a lathe or automatic screw machine (not shown), and is provided with an intermediate tapered bore 13. A transverse opening or slot 14 extends through the female rotary element 11 adjacent the small end of the tapered bore 13.

The large end of the tapered bore 13 is counterbored to form a cylindrical bore 15 of enlarged diameter in the female rotary element 11. One end of the male rotary component or drill shaft 10 is provided with a conically-shaped or tapered shank 16 having a taper complementary to that of the tapered bore 13 in the female rotary element 11. The shank 16 of the drill shaft 10 fits in tight frictional contact within the tapered bore 13 of the female rotary element 11 so the female rotary element 11 may impart rotation to the male component or drill shaft 10.

It will be observed that the shank 16 of the drill shaft 10 protrudes from the tapered bore 13 in the rotary element 11 into the slot 14 formed therein. Oppositely disposed flats 17 (Figures 1 and 2) are formed on the end of the shank 16 of the drill shaft 10 to facilitate insertion thereof into slot 14 so as to permit the engagement of the drill shaft 10 by a suitable tool inserted in the opening 14 to dislodge the same from the rotary element 11 for replacement, repair, etc. Although the invention has been illustrated and described with reference to a particular type of frictional engagement between the rotary element 11 and the drill shaft 10, it will be understood that various other forms of driving connections may be resorted to, such as that disclosed in our said prior United States Letters Patent No. 2,772,897, without departing from the spirit of the invention. The drill shaft 10 may have an intermediate cylindrical portion 18 of reduced diameter so as to fit loosely within the enlarged bore 15 formed in one end of the rotary element 11.

It will be observed that a pair of generally spiral passageways 20 extend from a medial portion of the shank 16 of the drill shaft 10 to the cutting end thereof (not shown). The rotary fluid connection embodying the present invention is adapted to pass fluid under pressure, such as a coolant or lubricant, to these spiral passageways 20 in the drill shaft 10 for cooling the same while aiding in washing the chips out of the hole made in an object against which the drill shaft 10 is directed.

Referring to the chuck adaptor or rotary element 11 of the rotary member 12 for the rotary fluid connection, it will be observed that an annular groove 23 is formed in the wall defining the tapered bore 13 intermediate the ends thereof. A plurality of substantially radially extending tubular pins 24 are fixed in the first rotary element and communicate with the groove 23. The tubular pins 24 project radially outwardly from the rotary member 12 for cooperation with a rotary sealing assembly 25 in a manner to be subsequently described. Two such tubular pins 24 are shown (Figure 4), but it is to be understood that one or more such pins 24 may be used without departing from the spirit of the invention.

The end of the chuck adaptor to the right of slot 14 (Figure 2) may be termed as its free or shank-receiving end. Adjacent this free end, the adaptor has an exterior surface comprising a series of stepped cylindrical portions progressively decreasing in diameter (Figure 3), beginning with stepped portion 30 having the largest diameter and proceeding in order with the stepped portions 31, 32, 33, 34, 35 and 36.

A stationary, generally cylindrical housing 40 surrounds the stepped portions on the rotary member 12. The housing 40 is provided with a cylindrical bore 41. At the end of the housing 40 which surrounds the stepped portion 36 on the free end of element 11 of the rotary member 12, there is a radially inwardly extending portion 42 forming a cylindrical bore 43 therethrough of reduced diameter relative to the bore 41. It will be observed that the right-hand end of the chuck adaptor or rotary element 11 of the rotary member 12 is journaled within the stationary housing 40 by means of a suitable bearing 44, which may be of the antifriction ball bearing type.

The outer race of the bearing 44 fits snugly within the cylindrical bore 43 formed in the inwardly extending portion 42 of the housing 40, while the inner race snugly surrounds the stepped cylindrical portion 36 formed on the rotary member 12. Suitable means, such as a set screw 44a, extending through the cylindrical stepped portion 36 may be provided to secure the bearing 44 in place. A shield or guard 45 for the bearing 44 is preferably provided, being held within a suitable recess formed in the exposed end of the portion 42, to prevent the leakage of lubricant from the bearing 44 out of the rotary fluid connection and the admission of foreign matter into the bearing 44.

A pair of axially spaced annular seal seats or face rings 46, 47 are carried within the stationary housing 40, being snugly engaged by the surface defining the cylindrical bore 41 therein. It will be noted that the seal seat 46 abuts against the shoulder formed by the inwardly extending portion 42. The proximal radial surfaces of the annular seal seats 46, 47 serve as stationary sealing surfaces, as will be presently described. The pair of seal seats 46, 47 are suitably sealed to the housing 40 by packing means, such as resilient O-ring seals 52, 53 received in suitable grooves provided in the surface defining the cylindrical bore 41.

An elongated spacing ring or lantern ring 54 is interposed between the annular seal seats 46, 47, being snugly received by the surface defining the cylindrical bore 41 and abutting at its opposite ends against the proximal radial surfaces of the seal seats. The medial portion of the lantern ring 54 is provide with an annular groove 55 in its outer periphery, which groove communicates with a plurality of radial ports 56 formed in the lantern ring 54 and extending inwardly therethrough.

Adjacent the left-hand end of the housing 40, there is provided a second bearing 57, which may be of the anti-friction ball bearing type, the outer race thereof being snugly received in a cylindrical bore 58 formed in the housing 40, and the inner race snugly surrounding the stepped cylindrical portion 31 on the rotary member 12. The anti-friction bearing 57 is axially spaced from the annular seal seat 47 by means of a spacer ring or lantern ring 60 interposed therebetween. The lantern ring 60 fits snugly within the bore 41 and is provided with a plurality of inwardly extending radial ports 59 for directing lubricant into the space between face ring 47 and bearing 57. Bore 58 is of sufficient depth to form an annular passage communicating with all the holes 59.

The inner race of bearing 57 is retained in place about the stepped cylindrical portion 31 of the rotary member 12 by a snap ring 61 suitably secured in a groove formed in the stepped portion 31 and engaging one end of said inner race. The other end of the inner race of bearing 57 bears against a shoulder formed at the juncture of the stepped cylindrical portions 30 and 31. Moreover, an externally threaded lock ring 62 is received within the corresponding threaded open end of the bore 58, the lock ring 62 engaging the outer race of the bearing 57 and being held in place by any suitable means, such as a set screw 63 which extends through the wall of the housing 40. The lock ring 62 may be slotted, as at 64, for reception of a tool, such as a spanner wrench, to facilitate removing the same or threading it in place.

A transverse threaded port 65 is provided in a medial portion of the housing 40, the port 65 communicating with the annular groove 55 formed in the outer periphery of the lantern ring 54. The threaded port 65 is adapted to receive a conduit or pipe P leading to a source of fluid under pressure, such as a coolant or lubricant, not shown. The bearings 44 and 57 are provided with suitable respective lubricant fittings 66 and 67 positioned on the outer periphery of the housing 40 and communicating with the respective bearings 44, 57 through suitable transverse ports formed in the housing 40.

In this connection, it will be noted that the spacer ring or lantern ring 60 is in radial alinement with the port connecting the lubricant fitting 67 to bearing 57. Thus, it will be apparent that lubricant may be fed from the fitting 67 through the housing 40 and through the spacer ring or lantern ring 60, entering into the passage formed by bore 58 and then passing through the radially extending ports 59 to the bearing 57.

It will be noted that the pair of annular seal seats 46, 47 define opposite ends of a fluid pressure chamber 70 located between the stationary housing 40 and the rotary member 12. Referring to the rotary sealing assembly 25 carried by the rotary member 12, it will be seen that this sealing assembly comprises a pair of sealing rings 71, 72 facing in opposite axial directions. The sealing ring 71 is provided with a barrel portion $a$ and a sealing nose $b$ radially inwardly off-set from the barrel portion $a$. The nose $b$ forms a planar or radial sealing surface adapted to engage the proximal radial surface formed on the seal seat 46.

It will be noted that the barrel portion $a$ comprises an axially slotted sleeve $d$ remote from the sealing nose $b$ and an enlarged conical portion $e$ adjacent to the nose $b$. The barrel portion $a$ of sealing ring 71 loosely surrounds the stepped cylindrical portion 34 formed on the rotary member 12, while the sealing nose $b$ loosely surrounds the stepped portion 35. Means are provided to seal between the sealing ring 71 and the rotary member 12, the means comprising an O-ring $f$ received in a suitable groove formed in the stepped cylindrical portion 34, and engaging the inner periphery of the barrel portion $a$.

The oppositely facing seal ring 72 is provided with a barrel portion $h$ and a sealing nose $j$ radially inwardly off-set from the barrel portion $h$. The nose $j$ also forms a radial or planar sealing surface adapted to engage the proximal radial surface of the annular seal seat 47. The barrel portion $h$ of sealing ring 72 comprises an axially slotted sleeve $k$ remote from the sealing nose $j$, an intermediate conical portion $m$, and a radially outwardly extending flange $n$ adjacent the sealing nose $j$.

Means are provided to seal between the sealing ring 72 and the rotary member 12. In this connection, it will be observed that the barrel portion $h$ of the sealing ring 72 loosely encircles the stepped cylindrical portion 33 of the rotary member 12, while the sealing nose $j$ loosely encircles the stepped cylindrical portion 32. Between the inner periphery of the barrel portion $h$ and the stepped cylindrical portion 33, there is interposed the sealing means in the form of an O-ring $p$. A stop ring $q$ snugly encircles the stepped cylindrical portion 33 of the rotary member 12 and abuts against the shoulder formed at the juncture between the stepped portions 32 and 33. Thus, it will be apparent that the O-ring $p$ is limited in its axial movement toward the left (as viewed in Figure 3) by the stop ring $q$.

The sealing rings 71, 72 are biased apart in opposite axial directions by suitable means, such as a coil spring 92. One end of the coil spring 92 is seated against the radial flange $n$ formed on the barrel portion $h$ of the sealing ring 72, while the opposite end of the coil spring 92 is seated in a suitable recess $r$ formed in the enlarged conical portion $e$ of barrel $a$ on sealing ring 71. The coil spring 92 provides a force which urges the radial sealing surfaces on the noses $b$, $j$ of the sealing rings 71, 72 into sealing engagement with the proximal radial surfaces on the pair of annular seal seats 46, 47, respectively.

It will be observed that the proximal portions of the barrels $a$, $h$ on the sealing rings 71, 72, or the axially slotted sleeves $d$, $k$, are disposed in loosely overlapping relationship and receive the tubular pins 24 projecting radially from the rotary member 12. Thus, it is apparent that the tubular pins 24 serve as driving means for the sealing rings 71, 72 in that the engagement between the tubular pins 24 and the respective slotted sleeves $d$, $k$ causes the sealing rings 71, 72 to rotate with the rotary member 12. It will also be observed that the slots formed in the sleeves $d$, $k$ are of sufficient axial length to permit the sealing rings 71, 72 to be movable axially of the rotary member 12 independently of each other.

In describing the operation of the rotary fluid connection, pressurized fluid, such as coolant or lubricant, may be introduced through fluid conduit P into the port 65 formed in the housing 40. From the port 65, the fluid is directed radially inwardly into the annular groove 55 formed in the lantern ring 54, after which it passes through the radial ports 56 and into the pressure chamber 70.

The fluid within the chamber 70 is prevented from escaping in opposite axial directions by the double-acting seal formed by the respective sets of relatively rotatable sealing surfaces on noses, $b$, $j$ and seats 46, 47. Thus, it is apparent that the fluid passes through the tubular pins 24 into the spiral passageways 20 formed in the rotary drill shaft 10 of the rotary member 12 to accomplish the purposes heretofore described.

It is thus seen that the sealing pressure holding said sets of relatively rotatable sealing surfaces in engagement is effected by the biasing action of the coil spring 92 substantially independently of the fluid pressure in the chamber 70. Referring to the sealing rings 71, 72, it will be observed that fluid pressure is effective against the proximal surfaces of the barrel portions $a$, $h$ of these rings and tends to augment the sealing pressure between the sets of relatively rotatable sealing surfaces formed by noses $b$, $j$ and seal seats 46, 47 effected by the coil spring 92. On the other hand, fluid pressure is also directed against the distal surfaces $s$, $t$ formed on the barrel portions $a$, $h$ in a direction tending to decrease the sealing pressure of the coil spring 92. The distal surfaces $s$, $t$ of the barrel portions $a$, $h$ therefore serve as a counterbalancing means for substantially canceling out the effect of fluid pressure within the chamber 70 on the sealing rings 71, 72. In this connection, it will be observed that the effective pressure areas of the distal surfaces $s$, $t$ are substantially equal to the effective pressure areas of the proximal surfaces on the barrel portions $a$, $h$.

It will be noted that the O-ring seals $f$, $p$ are of sufficient cross-sectional diameter to space their respective sealing rings 71, 72 from the stepped cylindrical portions of the rotary member 12 which they surround. In effect, therefore, the sealing rings 71, 72 are resiliently mounted about the rotary member 12 for limited canting movement with respect thereto to compensate for any misalinement between the rotary member 12 and the housing 40. This canting movement of the sealing rings 71, 72 permits the radial sealing surfaces on the noses $b$, $j$ thereof to be maintained in engagement with the proximal radial surfaces of the annular seal seats 46, 47, even though some degree of misalinement between the rotary member 12 and the stationary housing 40 may occur.

It will be further observed that fluid pressure within the chamber 70, and acting against the O-ring seals $f$, $p$ will not be transmitted to their respective sealing rings 71, 72. In this connection, the fluid pressure acting against the O-ring $f$ forces it axially to the right (as viewed in Figure 3) against one side wall of the corresponding groove formed in the stepped cylindrical portion 34 of the rotary member 11. The axially directed force of the fluid pressure acting on O-ring $f$ is, therefore, absorbed by the side wall of the groove against which O-ring $f$ is forced and is not transmitted to the sealing ring 71. In a similar manner, the fluid pressure acting against the O-ring $p$ forces it axially to the left (as viewed in Figure 3) into abutment with the stop ring $q$ which absorbs the axially directed force of the fluid pressure, thus preventing the same from being transmitted to the sealing ring 72.

Thus, it is seen that there has been disclosed a mechanical sealing arrangement for a rotary fluid connection which constitutes an improvement over our prior United States Letters Patent No. 2,772,897 referred to previously, wherein the rotary sealing rings 71, 72 of the present mechanical seal housed in the pressure chamber 70 engage their respective seal seats 46, 47 under a sealing pressure effected by the coil spring 92 substantially independently of the fluid pressure within the chamber 70. Moreover, it will be apparent that the sealing rings 71, 72 are so mounted about the rotary member 12 that they may compensate for misalinement between the rotary member 12 and the stationary housing 40 for maintaining an effective seal should such misalinement occur. The mechanical seal of the present invention is composed of a relatively small number of parts having few surfaces subjected to friction and wear. The annular seal seats 46, 47 are preferably made from graphite, carbon or the like, while the sealing rings 71, 72 may be made from hardened steel, but it will be understood that these elements may be made from any suitable bearing material having good wearing characteristics.

Although this invention has been described with particular reference to its use with a rotary drill, it is contemplated that the rotary member 12 may be formed as an integral element having a longitudinal passageway or passageways extending therein, rather than the two-piece rotary member illustrated.

In the drawings and specification, there has been set forth a preferred embodiment of the invention and, although specific terms are employed, they are used in a generic and descriptive sense only, and not for purposes of limitation, the scope of the invention being defined in the claims.

We claim:

1. A rotary fluid connection comprising a stationary housing, a rotary member extending through said housing, said housing being provided with a chamber for containing fluid and said rotary member having a longitudinally extending fluid passageway therein, a pair of axially spaced annular seal seats fixed within said housing and defining the end boundaries of the fluid chamber within said housing, a pair of oppositely facing sealing rings disposed within the chamber and encircling said rotary member; sealing means disposed between said rotary member and said oppositely facing sealing rings, each of said sealing rings comprising a barrel having a radially outwardly extending flange, an annular sealing nose joined to said barrel and extending axially outwardly thereof, and the juncture between said barrel and said nose being in substantial radial alinement with said radially outwardly extending flange; at least one tubular pin fixedly secured to the rotary member and extending radially outwardly thereof at a position between the annular seal seats, the opposite ends of said tubular pin opening into the chamber and the passageway respectively to establish fluid communication therebetween, the barrels of said sealing rings extending in loosely overlapping relationship and having alined axially elongated slots therein, said tubular pin loosely extending into said slots to constrain said sealing rings to rotate with said rotary member while leaving said sealing rings free to move axially with respect to said rotary member, said radially outwardly extending flanges on said pair of sealing rings being axially spaced from each other and extending radially outwardly to a greater extent than said tubular pin, a resilient spring compressed between the radially outwardly extending flanges on said pair of sealing rings and disposed radially outwardly of said tubular pin to bias said sealing rings in opposite axial directions into relatively rotatable sealing engagement with said seal seats, said noses abutting against said seal seats respectively and axially spacing said radial flanges inwardly of said seal seats, and means to introduce fluid through said housing and into said chamber for transmission through said tubular pin to said passageway.

2. A rotary fluid connection comprising a stationary housing, a rotary member extending through said housing, said housing being provided with a chamber for containing fluid and said rotary member having a longitudinally extending fluid passageway therein, a pair of axially spaced annular seal seats fixed within said housing and defining the end boundaries of the fluid chamber within said housing, a pair of oppositely facing sealing rings disposed within the chamber and loosely encircling said rotary member; each of said sealing rings comprising a barrel having a radially outwardly extending flange, an annular sealing nose joined to said barrel, said nose being radially inwardly offset with respect to said barrel and extending axially outwardly thereof, and the juncture between said barrel and said nose being in substantial radial alinement with said radially outwardly extending flange; at least one tubular pin fixedly secured to the rotary member and extending radially outwardly thereof at a position between the annular seal seats, the opposite ends of said tubular pin opening into the chamber and the passageway respectively to establish fluid communication therebetween, the barrels of said sealing rings extending in loosely overlapping relationship and having alined axially elongated slots therein, said tubular pin loosely extending into said slots to constrain said sealing rings to rotate with said rotary member while leaving said sealing rings free to move axially with respect to said rotary member, said radially outwardly extending flanges on said pair of sealing rings being axially spaced from each other and extending radially outwardly to a greater extent than said tubular pin, a resilient spring compressed between the radially outwardly extending flanges on said pair of sealing rings and disposed radially outwardly of said tubular pin to bias said sealing rings in opposite axial directions into relatively rotatable sealing engagement with said seal seats, means providing axially spaced shoulders on said rotary member respectively disposed within each of said barrels of said sealing rings, resilient O-rings carried by said rotary member axially inwardly of said shoulders respectively and sealingly engaging said rotary member and the barrels of said sealing rings, said noses abutting against said respective seal seats and axially spacing said radial flanges inwardly of said seal seats, means to introduce fluid through said housing and into said chamber for transmission through said tubular pin to said passageway, said O-rings being movable under the influence of fluid pressure into abutment with the corresponding shoulders on said rotary member, and the distal surfaces of said radial flanges which are respectively spaced inwardly of said seal seats defining pressure counterbalancing surfaces on said pair of sealing rings, whereby the force of fluid pressure in the chamber applied against the pair of sealing rings urging said sealing rings in opposite axial directions into relatively rotatable sealing engagement with said seal seats to augment the biasing force provided by said resilient spring is at least partially counterbalanced.

References Cited in the file of this patent

UNITED STATES PATENTS

| | | |
|---|---|---|
| 1,859,436 | Durdin | May 24, 1932 |
| 2,463,326 | Smisko et al. | Mar. 1, 1949 |
| 2,479,711 | Arutunoff | Aug. 23, 1949 |
| 2,561,132 | Payne | July 17, 1951 |
| 2,709,093 | Zeeb | May 24, 1955 |
| 2,772,897 | Shaw et al. | Dec. 4, 1956 |
| 2,777,702 | Rodal | Jan. 15, 1957 |